US008397072B2

(12) United States Patent
Torrubia et al.

(10) Patent No.: US 8,397,072 B2
(45) Date of Patent: Mar. 12, 2013

(54) COMPUTER-IMPLEMENTED METHOD AND SYSTEM FOR EMBEDDING ANCILLARY INFORMATION INTO THE HEADER OF A DIGITALLY SIGNED EXECUTABLE

(75) Inventors: Andres M. Torrubia, Alicante (ES); Miguel A. Roman, Alicante (ES)

(73) Assignee: Rovi Solutions Corporation, Santa Clara, CA (US)

( * ) Notice: Subject to any disclaimer, the term of this patent is extended or adjusted under 35 U.S.C. 154(b) by 877 days.

(21) Appl. No.: 11/395,194

(22) Filed: Mar. 31, 2006

(65) Prior Publication Data
US 2006/0265591 A1 Nov. 23, 2006

Related U.S. Application Data

(60) Provisional application No. 60/683,190, filed on May 20, 2005.

(51) Int. Cl.
*H04L 9/00* (2006.01)

(52) U.S. Cl. .......................... 713/176; 713/156; 713/160

(58) Field of Classification Search .................. 713/156, 713/160, 176, 156.16
See application file for complete search history.

(56) References Cited

U.S. PATENT DOCUMENTS

| 5,892,904 | A | 4/1999 | Atkinson et al. | |
|---|---|---|---|---|
| 6,049,671 | A * | 4/2000 | Slivka et al. | 717/173 |
| 6,367,012 | B1 * | 4/2002 | Atkinson et al. | 713/176 |
| 6,804,779 | B1 | 10/2004 | Carroni et al. | |
| 7,283,965 | B1 * | 10/2007 | Michener | 704/500 |
| 7,370,211 | B2 | 5/2008 | Rindborg et al. | |
| 7,401,221 | B2 | 7/2008 | Adent et al. | |
| 7,451,467 | B2 | 11/2008 | Carver et al. | |
| 2002/0038348 | A1 | 3/2002 | Malone et al. | |
| 2002/0082997 | A1 | 6/2002 | Kobata et al. | |
| 2002/0198864 | A1 | 12/2002 | Ostermann et al. | |
| 2003/0088783 | A1 * | 5/2003 | DiPierro | 713/189 |
| 2003/0188160 | A1 | 10/2003 | Sunder et al. | |
| 2004/0025181 | A1 | 2/2004 | Addington et al. | |
| 2004/0054912 | A1 * | 3/2004 | Adent et al. | 713/181 |
| 2004/0107356 | A1 * | 6/2004 | Shamoon et al. | 713/193 |
| 2004/0261117 | A1 | 12/2004 | Kuh | |
| 2005/0004946 | A1 | 1/2005 | Kawamoto et al. | |

(Continued)

FOREIGN PATENT DOCUMENTS

| EP | 1049014 A2 | 11/2000 |
|---|---|---|
| EP | 1081912 A2 | 3/2001 |

(Continued)

OTHER PUBLICATIONS

"U.S. Appl. No. 11/953,293, Non Final Office Action mailed Jul. 21, 2011", 9 pgs.

(Continued)

*Primary Examiner* — Kambiz Zand
*Assistant Examiner* — Tongoc Tran
(74) *Attorney, Agent, or Firm* — Schwegman Lundberg & Woesnner, P.A.

(57) ABSTRACT

A computer-implemented method and system for embedding ancillary information into the header of a digitally signed executable are disclosed. The method and system include identifying a digital signature block and a digital signature size block in a digitally signed file header, modifying a digital signature size value in the digital signature size block, the modified value corresponding to the size of the digital signature block plus the length of an ancillary data block plus a pre-determined pad, storing the modified digital signature size in the digital signature size block, and appending the ancillary data block to the end of the digital signature block.

26 Claims, 7 Drawing Sheets

U.S. PATENT DOCUMENTS

| | | | |
|---|---|---|---|
| 2005/0071633 A1 | 3/2005 | Rothstein | |
| 2005/0080788 A1 | 4/2005 | Murata | |
| 2005/0086501 A1* | 4/2005 | Woo et al. | 713/189 |
| 2005/0188203 A1* | 8/2005 | Bhaskaran et al. | 713/176 |
| 2005/0246732 A1 | 11/2005 | Dudkiewicz et al. | |
| 2005/0262502 A1* | 11/2005 | Lari et al. | 717/175 |
| 2006/0026662 A1 | 2/2006 | Shield et al. | |
| 2006/0031763 A1 | 2/2006 | Yeung | |
| 2006/0041580 A1 | 2/2006 | Ozdemir et al. | |
| 2006/0085824 A1 | 4/2006 | Bruck et al. | |
| 2006/0184798 A1* | 8/2006 | Yaldwyn et al. | 713/180 |
| 2006/0218604 A1 | 9/2006 | Riedl et al. | |
| 2006/0265591 A1 | 11/2006 | Torrubia et al. | |
| 2008/0089435 A1 | 4/2008 | Torrubia et al. | |
| 2008/0133928 A1 | 6/2008 | Torrubia et al. | |
| 2008/0159715 A1 | 7/2008 | Fuasaro et al. | |

FOREIGN PATENT DOCUMENTS

| | | |
|---|---|---|
| EP | 1396978 A2 | 3/2004 |
| EP | 1638031 A1 | 3/2006 |
| JP | 2001043192 A | 2/2001 |
| JP | 2002503365 A | 1/2002 |
| JP | 2003509913 A | 3/2003 |
| JP | 2004056793 A | 2/2004 |
| JP | 2004265380 A | 9/2004 |
| JP | 2004328548 A | 11/2004 |
| JP | 2005514703 A | 5/2005 |
| JP | 2005148778 A | 6/2005 |
| JP | 2007013360 A | 1/2007 |
| JP | 2010535372 A | 11/2010 |
| JP | 4972208 | 4/2012 |
| JP | 2012142022 A | 7/2012 |
| KR | 101085365 B1 | 11/2011 |
| WO | WO-9845768 A1 | 10/1998 |
| WO | WO-03028283 A1 | 4/2003 |
| WO | WO-03058485 A1 | 7/2003 |
| WO | WO-03058485 A1 | 7/2003 |
| WO | WO-2007054137 A1 | 5/2007 |
| WO | WO-2009016426 A1 | 2/2009 |
| WO | WO-2009016427 A1 | 2/2009 |

OTHER PUBLICATIONS

"U.S. Appl. No. 12/696,725, Non Final Office Action mailed May 26, 2011", 9 pgs.

"U.S. Appl. No. 12/696,725, Response filed Oct. 26, 2011 to Non Final Office Action mailed Apr. 26, 2011", 10 pgs.

"Japanese Application Serial No. 2010-518757, Office Action mailed Sep. 30, 2011", 10 pgs.

"U.S. Appl. No. 12/031,104, Non Final Office Action mailed Jan. 26, 2011", 10 pgs.

"Australian Application Serial No. 2007357078, Examiner Report mailed Nov. 15, 2010", 2 pgs.

"European Application Serial No. 06840908.5, Office Action mailed Apr. 10, 2008", 5 pgs.

"International Application Serial No. PCT/IB2007/003032, International Preliminary Report on Patentability mailed Feb. 11, 2010", 5 pgs.

"International Application Serial No. PCT/IB2007/003041, International Preliminary Report on Patentability mailed Feb. 11, 2010", 8 pgs.

"Japanese Application Serial No. 2008-511613, Notice of Allowance mailed Feb. 22, 2011", 6 pgs.

"Japanese Application Serial No. 2008-511613, Office Action mailed Dec. 14, 2010", 6 pgs.

"Korean Application Serial No. 10-2010-7004137, Office Action mailed Mar. 29, 2011", 4 pgs.

"U.S. Appl. No. 11/953,293, Preliminary Amendment mailed Jan. 23, 2008", 3 pgs.

"How to get Information from Authenticode Signed Executables", Microsoft, [Online]. Retrieved from the Intenet: <URL: http://support.microsoft.com/kb/323809/en-us>, (Sep. 27, 2004).

"International Application Serial No. PCT/EP2006/004628, International Preliminary Report on Patentability mailed Dec. 6, 2007", 10 pgs.

"International Application Serial No. PCT/EP2006/004628, International Search Report Dec. 4, 2006", 9 pgs.

"International Application Serial No. PCT/EP2006/004628, Written Opinion Dec. 4, 2006", 8 pgs.

"International Application Serial No. PCT/IB2007/003032, Written Opinion of the International Searching Authority mailed Apr. 4, 2008", 7 Pgs.

"International Application Serial No. PCT/IB2007/003041, International Search Report and Written Opinion mailed Sep. 1, 2008", 13 pgs.

"International Application Serial No. PCT/IB2007/003032, International Search Report mailed Apr. 4, 2008", 5 Pgs.

Dahl, Pia, "International Search Report", Patent Cooperation Treaty From the International Searching Authority, 12 Pages.

"European Application Serial No. 06840908.5, Response filed Jul. 28, 2008 to Office Action mailed Apr. 10, 2008", 20 pgs.

"International Application Serial No. PCT/IB2007/003041, International Preliminary Report on Patentability mailed Feb. 11, 2010".

"Korean Application Serial No. 10-2010-7004137, Office Action mailed Mar. 29, 2011", 3 ages.

"Korean Application Serial No. 10-2010-7004137, Office Action Response", 4 pgs.

"U.S. Appl. No. 11/953,293, Final office Action mailed Apr. 13, 2012", 8 pgs.

"U.S. Appl. No. 11/953,293, Response filed Dec. 21, 2011 to Non Final Office Action mailed Jul. 21, 2011", 9 pgs.

"U.S. Appl. No. 12/696,725 Final Office Action mailed Mar. 7, 2012", 9 pgs.

"Australian Application Serial No. 2007357078, First Examiner Report Response filed Feb. 3, 2012", 2 pgs.

"Australian Application Serial No. 2007357078, Office Action filed Nov. 15, 2011", 16 pgs.

"Australian Application Serial No. 2007357078, Office Action mailed Feb. 29, 2012", 2 pgs.

"Australian Application Serial No. 2007357078, Office Action Response Filed Apr. 5, 2012", 15 Pgs.

"Australian Application Serial No. 2007357078, Sub Examiner Report mailed Dec. 12, 2011", 2 pgs.

"Australian Application Serial No. 2007357078, Subsequent Examiners Report mailed May 3, 2012", 2 pgs.

"Canadian Application Serial No. 2,690,095, Office Action mailed Feb. 2, 2012", 3 pgs.

"Canadian Application Serial No. 2701776, Office Action Mailed May 8, 2012", 3 Pgs.

"Japanese Application Serial No. 2010-518756, Office Action mailed Jan. 18, 2012", w/eng. translation, 11 pgs.

"Japanese Application Serial No. 2010-518756, Office Action mailed May 11, 2012", w/eng. translation, 14 pgs.

"Japanese Application Serial No. 2010-518756, Response filed Apr. 17, 2012 to Office Action mailed Jan. 18, 2012", 8 pgs.

"Japanese Application Serial No. 2010-518757, Response filed Dec. 16, 2011 to Office Action mailed Sep. 16, 2011", 5 pgs.

"Japanese Application Serial No. 2012-087430, Voluntary Amendments filed May 2, 2012", 5 pgs.

"U.S. Appl. No. 11/953,293 , Response filed Aug. 13, 2012 to Final Office Action mailed Apr. 13, 2012", 10 pgs.

"U.S. Appl. No. 11/953,293, Non Final Office Action mailed Sep. 7, 2012", 11 pgs.

"U.S. Appl. No. 12/696,725 , Response filed Aug. 7, 2012 to Final Office Action mailed Mar. 7, 2012", 10 pgs.

"U.S. Appl. No. 12/696,725, Non Final Office Action mailed Oct. 10, 2012", 10 pgs.

"Canadian Application Serial No. 2,690,095, Response filed Jul. 11, 2012 to Office Action mailed Feb. 2, 2012", 8 pgs.

"European Application Serial No. 07825346.5, Office Action mailed Sep. 5, 2012", 5 pgs.

* cited by examiner

COMPUTER-IMPLEMENTED METHOD AND SYSTEM FOR EMBEDDING ANCILLARY INFORMATION INTO THE HEADER OF A DIGITALLY SIGNED EXECUTABLE

CROSS-REFERENCE TO PRIORITY PATENT APPLICATIONS

This patent application claims the benefit of the filing date of U.S. Provisional Patent Application Ser. No. 60/683,190, filed May 20, 2005, and entitled, "Method and Apparatus for Tracking Digitally Signed Files for Digital Distribution," which is incorporated herein by reference.

BACKGROUND

1. Technical Field

This disclosure relates to digital signature and digital certificate methods and systems. More particularly, the present disclosure relates to the use of digital signatures and digital certificates with executable software.

2. Related Art

The advent of digital distribution has created new business models for the delivery of software over the internet. In the "try and buy" a digital distribution model, consumers may sample "try and buy" versions of software before making a purchase decision. Such "try and buy" versions consist of locked down versions of software executables that get unlocked after purchase. In a common scenario, an end-user or potential customer may download a freely available, "try and buy" software application (the installer, henceforth) from the publisher website or general-purpose web portals (e.g. www.download.com, www.yahoo.com, etc., portals, henceforth). Typically, a percentage of the users that download and install the "try and buy" installers purchase the software (or services, or subscriptions associated with it) to obtain a full version of the software product. As such, software manufacturers have an incentive to make "try and buy" software available for download by end-users. Software manufacturers do so by placing such "try and buy" versions on their own websites for end users to download. In addition, software manufacturers may distribute these installers across portals, that are not necessarily controlled by software manufacturers. The motivation behind the "try and buy" business model for the software publishers lies in the fact that they get compensated when the consumer makes a purchase related to the "try and buy" software. In addition, portals arrange business deals with software manufacturers, publishers, or aggregators so that the portals are compensated when "try and buy" installers are downloaded from the portal sites and generate revenue. Typically, portals get a revenue share of the price paid by the consumer.

The "try and buy" installers contain means for end users to purchase the full version of the software application. As part of the purchase transaction, the end-users may be instructed to perform various steps in the online purchase transaction. Such instructions may include, for example, 1) textual descriptions to complete an economic transaction, e.g. send a check to P.O. Box xyz, and receive instructions to obtain the full version of the software application, 2) a URL that contains instructions or means for carrying out online e-commerce transactions (e.g. credit card payments), 3) a purchase mechanism built into the application itself, 4) a purchase mechanism built into a wrapper around the software application, or 5) any combination of these instructions. Because the same software product is normally distributed across multiple distribution networks (e.g. multiple portals), a way of tracking, which distribution network was responsible for a particular purchase is required. One way of determining which distribution network was responsible for a particular purchase is to create traceable versions of the software product. One way of creating traceable versions consists of creating different installers that contain information to identify the distribution network in the purchase instructions. For example, a software product may have a purchase URL embedded containing a value identifying a particular distribution network, for example: http://my.trymedia.com/buy?sku= 0123& affiliate=abc Such a URL can be used for software distribution across a distribution network identified by the parameter, "affiliate=abc". If the same software product is to be distributed across another distribution network (e.g. "affiliate=xyz"), then another version of the same software product must be created having a purchase URL embedded that identifies the other distribution network, for example: http://my.trymedia.com/buy?sku=0123&affiliate=xyz Software publishers may create different, traceable versions of a software product by a variety of means that are known to those of ordinary skill in the art. For example, 1) recompiling the software executables containing different ancillary information to identify a distribution channel, 2) including such information in an auxiliary file, resource, or data referenced by the instructions of the purchasing process, or 3) any combination of the above. In most cases, it is advisable to create different traceable versions of the same software product without involving the software manufacturer, so the process can be scaled as efficiently as possible. One possible way to do so is to embed distribution related information in a predefined location in the installer or in a predefined location in the registry of a filesystem when an installer is first executed. One benefit of the embedding distribution related information in the installer is that this method does not require the software manufacturer to create a specific version of the software for each distribution network. Nevertheless, creating and managing different installers for each of a growing number of distribution networks has become a very difficult task.

The introduction of digital signatures in executables provides security benefits for software manufacturers and end-users. For end users, digital signatures of executables provide a tool to ensure that the executable has not been modified in any way since it was signed, typically by the software manufacturer. For software manufacturers, the benefit translates in less chances of having their software modified or altered without permission (e.g. by a computer virus that infects the executable), resulting in less support calls and more user confidence in the software. In the Microsoft™ Windows operating system executables, digital signatures are implemented in the form of certificates. In the header of an executable, a certificate table is provided, which contains information to access various attributes of the digital certificate. Once the software manufacturer has signed an executable file, the contents of the executable cannot be easily changed without rendering the certificate invalid or causing the digital signature of the file to mismatch with the digital certificate of the file. In addition, the growing threats of viruses, spyware, and other malware is making operating systems and Internet browser vendors more likely to issue warnings when executable files are not digitally signed. This will surely result in further adoption and widespread use of digital signatures with executables.

However, as described above, it is inefficient to create different versions of software products for different distribution networks. Further, it is very difficult to modify the contents of executables without destroying the integrity of the digital signature of the executable. As such, it is very difficult for someone other than a software manufacturer to create traceable copies of software products; because modifying the ancillary distribution-related information for a traceable copy would invalidate the digital signature.

Thus, a computer-implemented method and system for embedding ancillary information into the header of a digitally signed executable are needed.

BRIEF DESCRIPTION OF THE DRAWINGS

Embodiments illustrated by way of example and not limitation in the figures of the accompanying drawings, in which.

DETAILED DESCRIPTION

A computer-implemented method and system for embedding ancillary information into the header of a digitally signed executable are disclosed. In the following description, numerous specific details are set forth. However, it is understood that embodiments may be practiced without these specific details. In other instances, well-known processes, structures and techniques have not been shown in detail in order not to obscure the clarity of this description.

Figure 1:
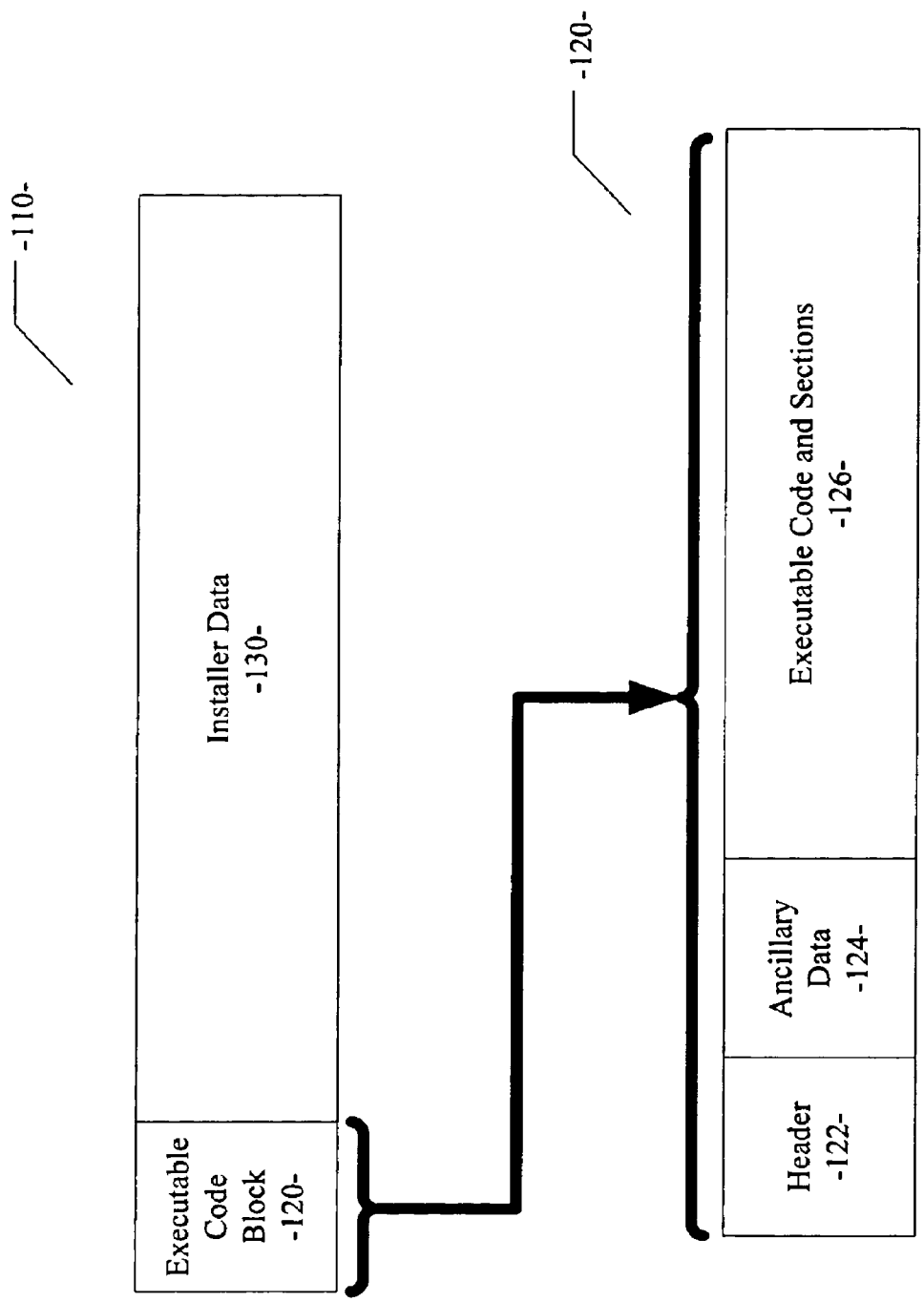
FIG. 1 illustrates an embodiment in which ancillary information is stored in the header portion of an executable file.
Figure 2:
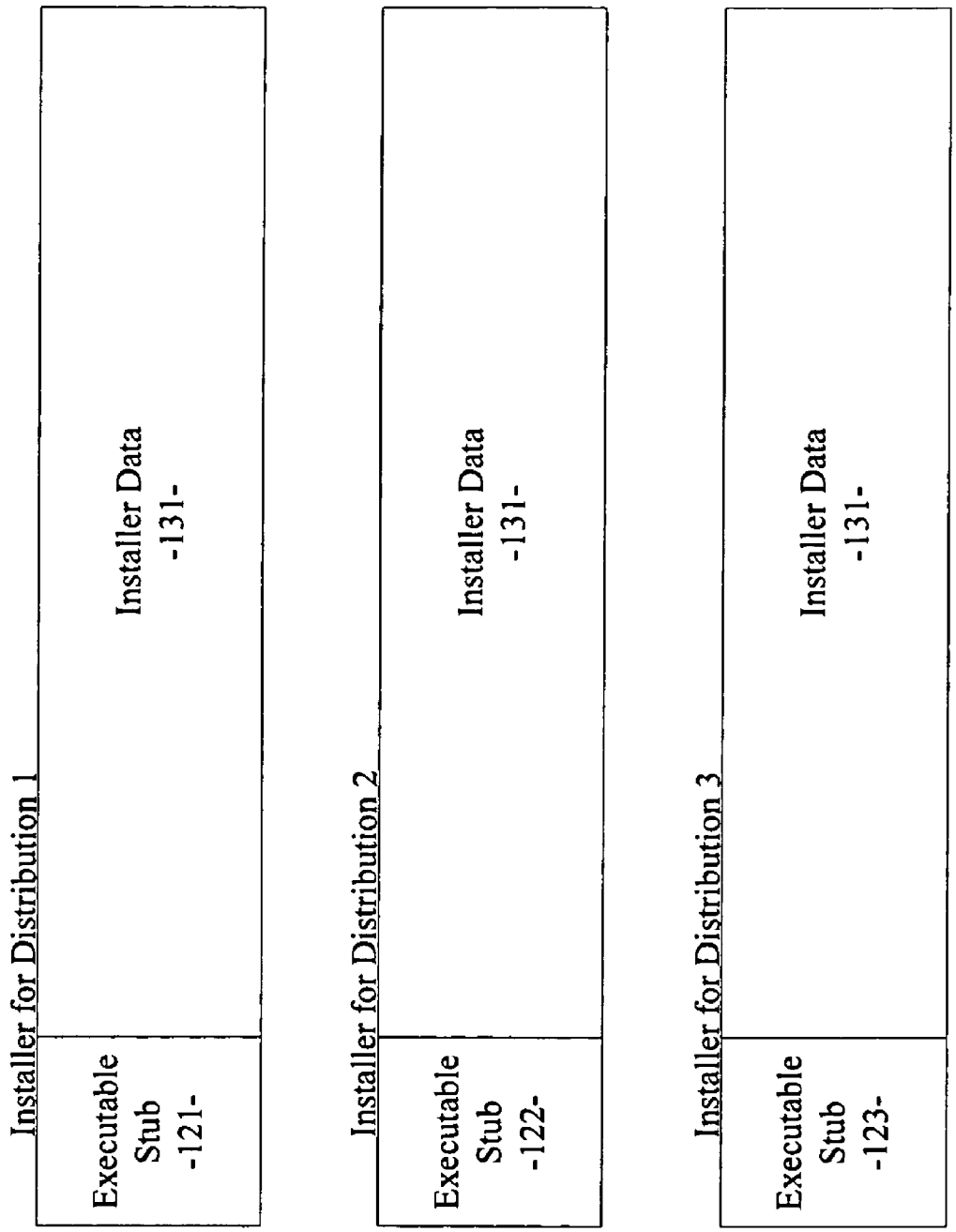
FIG. 2 illustrates examples of three different installers with different ancillary data within their respective executable code blocks.

FIG. 1 illustrates an embodiment in which ancillary information (e.g. distribution information) is stored in the header portion of the executable part of an installer. As shown, an installer 110 includes an executable code block 120 and installer data 130. Executable code block 120 is comprised of a header portion 122, and ancillary data portion 124 that resides within the header portion, and an executable code section 126. Ancillary data 124, can include distribution related information, URLs, pricing information, timestamps, distribution channel information, business rules, digital rights management (DRM) information, distributor branding information, pointers or links to other information, and any other information of use to a software manufacturer, distributor, wholesaler, retailer, or end user. It will be apparent to one of ordinary skill in the art that a variety of different types of information, including aggregations or combinations of different types of ancillary information may be included in ancillary data 124. Such ancillary information 124 can be created, stored, and transferred within an installer to which it relates. Given ancillary data block 124 within installer 110, a specific installer can be created for a particular software product. For example, the same software product can be distributed in multiple different methods using multiple different specific installers, each with specific ancillary data 124 that defines the distribution methodology for that particular distribution network. Referring to FIG. 2, examples of three such different installers with different ancillary data within their respective executable code blocks, 121, 122, and 123 are illustrated. Each of the three example installers illustrated in FIG. 2 can be used to distribute a software product in a particular distribution network; note that the installer data 131 is the same on the three different installers Only the executable code blocks, 121, 122, and 123 are different to reflect the different distribution networks for each installer.

Figure 3:
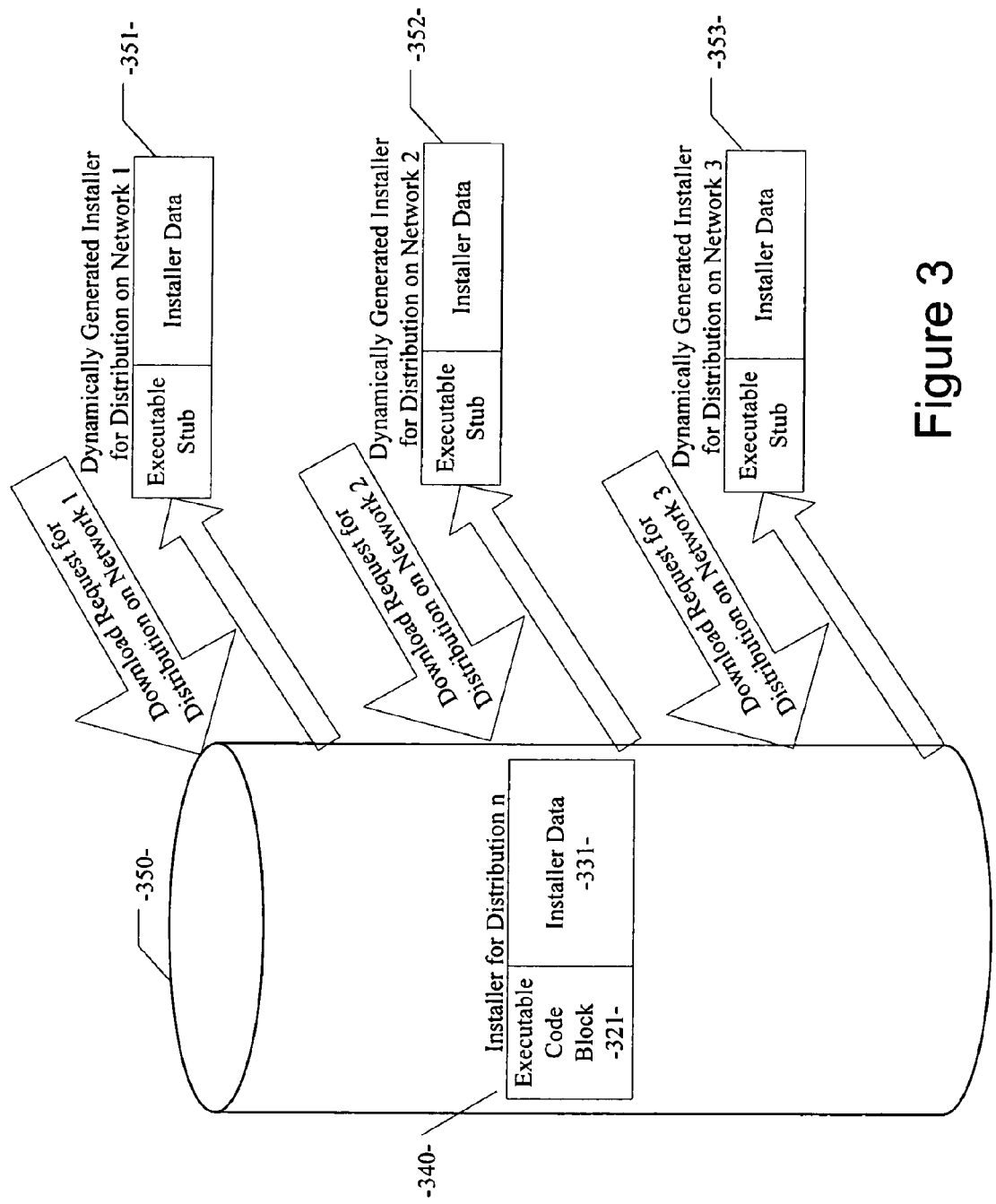
FIG. 3 illustrates an example of how distribution on a variety of distribution networks is accomplished in various embodiments.

Referring to FIG. 3, an example illustrates how distribution on a variety of distribution networks is accomplished in various embodiments. In the example of FIG. 3, a server 350 includes an installer template 340. The installer template 340 includes an executable code block 321 and installer data 331. Upon receiving a request for the download of a particular software product on a particular distribution network (e.g. network 1), server 350 generates distribution network-specific information (e.g. network 1) and stores the information in a copy of installer template 340. The distribution network-specific installer 351 can then be sent to the originator of the request for distribution of the software product on the specific distribution network. Similarly, other distribution network-specific installers, 352 and 353, can be generated from installer template 340 and sent to the originators of those particular download requests. In this manner, an efficient and scalable solution for the distribution of software products in a multiple of distribution networks is provided.

The use of digital signatures in downloaded executables is becoming increasingly more common. However, once the software manufacturer has signed an executable file, the contents of the executable cannot be easily changed without rendering the certificate invalid or causing the digital signature of the file to mismatch with the digital certificate of the file. As such, it has become difficult to insert ancillary information into the installer for a particular software product download. Nevertheless, various embodiments described herein solve this problem, as will be described in more detail below.

Figure 4:
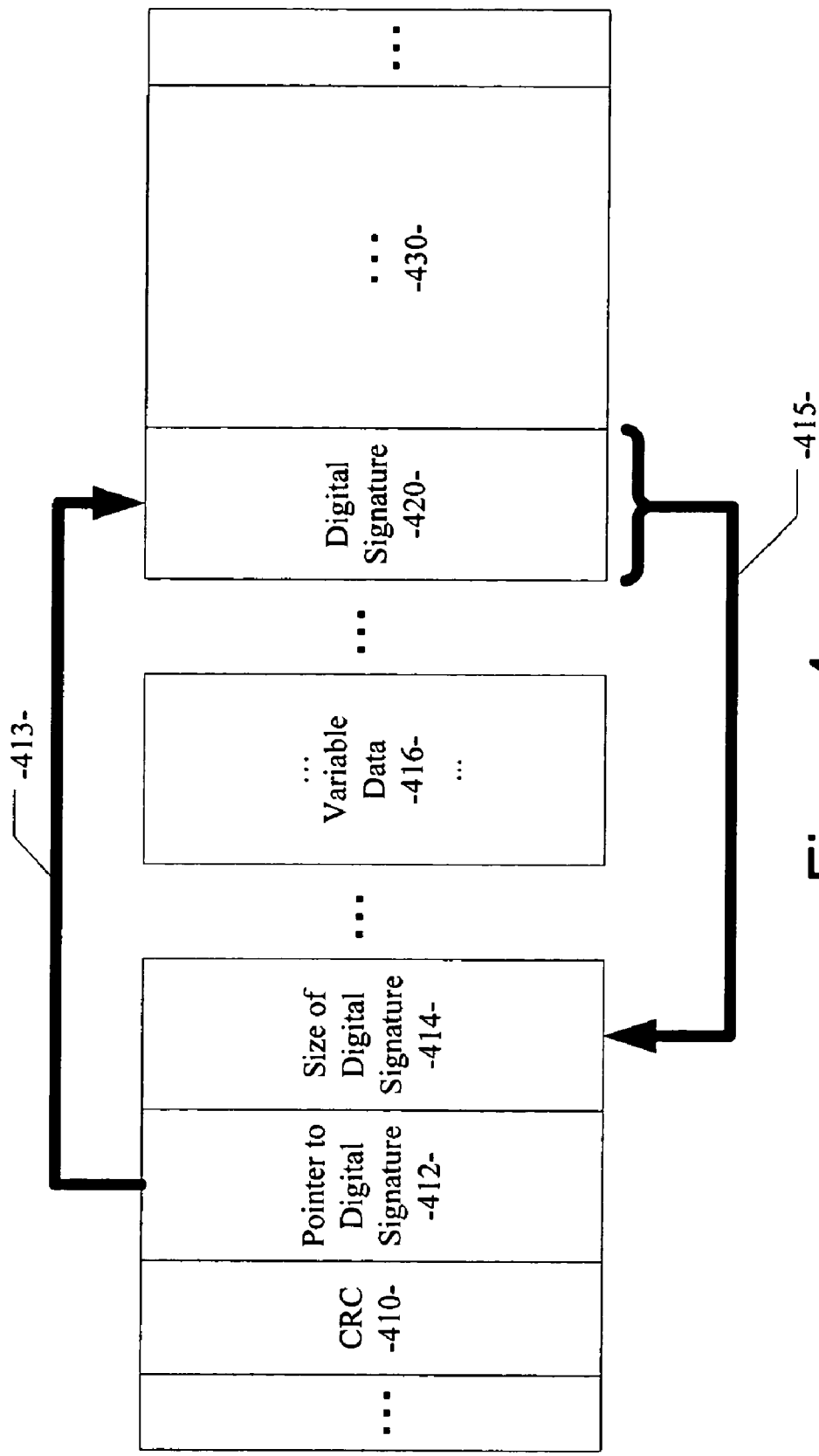
FIG. 4 illustrates a typical structure of a digitally signed executable file.

Referring to FIG. 4, a typical structure of a digitally signed executable file 401 is illustrated. File 401 typically includes a cyclic redundancy check (CRC) block 410, a digital signature pointer 412, a digital signature size 414, a variable data block 416, a digital signature block 420, and an unused portion 430. As well known to those of ordinary skill in the art, digital signature 420 is generated from a hash of the variable data 416 and executable headers in combination with the private key of the software developer and the private key of a trusted authority. Variable data 416 can be virtually any code or data payload within the file 401, including executable headers. Typically, a downloadable software product and related data can be stored in variable data block 416. Once the software product is stored in variable data block of 416 and the digital signature 420 is generated from the content of variable data block 416, it becomes very difficult to modify any portion of variable data block 416 without invalidating digital signature 420. The size of the generated digital signature 420 is stored in digital signature size block of 414. Because variable data block 416 can be of variable size, a pointer 413 to digital signature 420 is stored in digital signature pointer block 412. In typical implementations of digitally signed executable file 401, CRC block 410, digital signature pointer 412, and digital signature size 414 are not included in the computation of digital signature 420. As such, these blocks of file 401 can be modified without invalidating digital signature 420.

Figure 5:
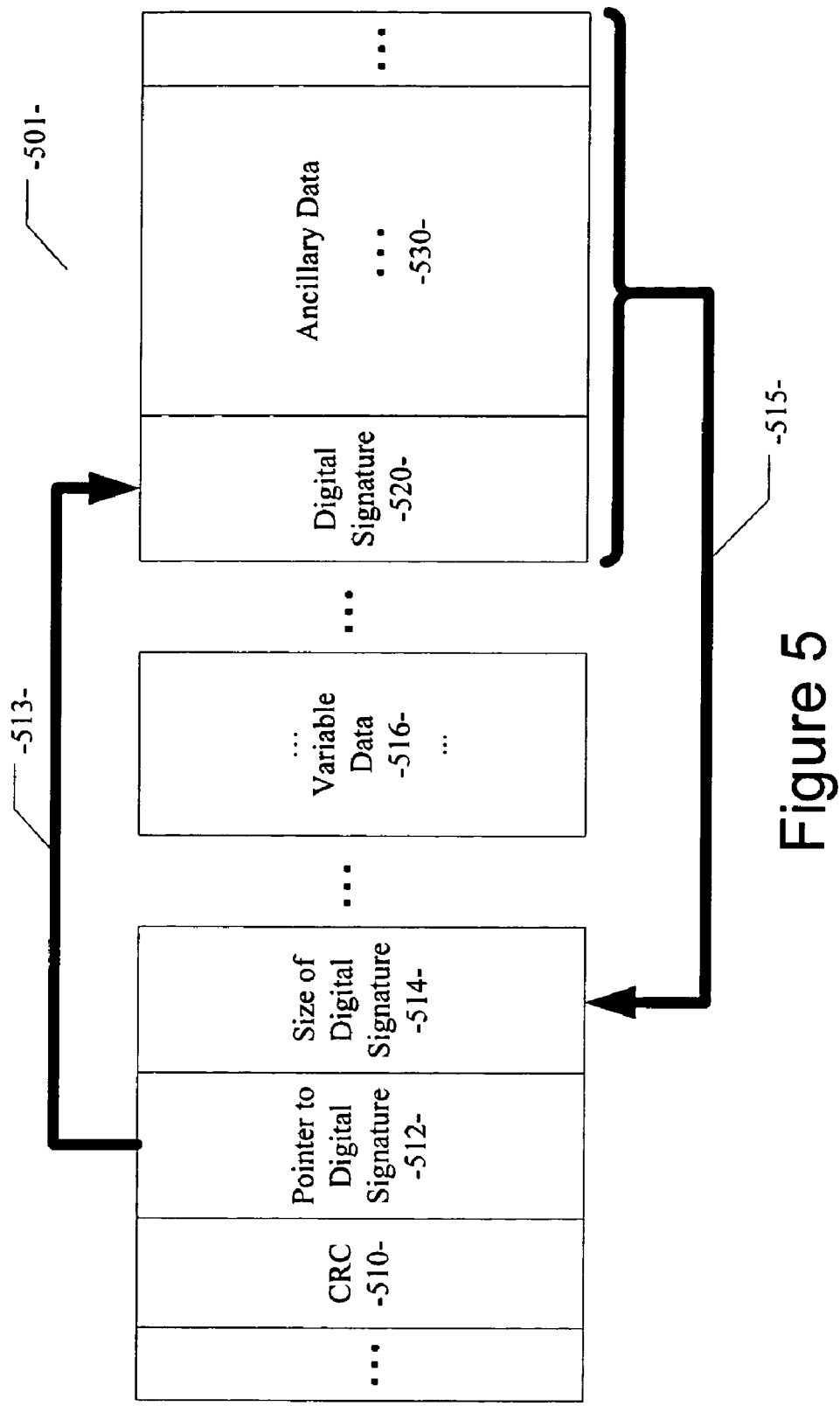
FIG. 5 illustrates a modified digitally signed executable file according to various embodiments.

Referring to FIG. 5, a modified digitally signed executable file 501 according to various embodiments is illustrated. File 501 has been modified by changing the value of the digital signature size residing in block 514. The value of the digital signature size has been modified by taking the size of the digital signature 520 and adding to it the size of unused block 530. In some cases, it may be necessary to increase (or decrease) the modified digital signature size value by a predetermined pad value to terminate ancillary data block 530 on a byte, word, page, or other memory segment boundary. In other cases, it may be necessary to preliminarily zero out or store a default value in each memory location of ancillary data block 530. This new digital signature size value is stored in digital signature size block 514 as shown by arrow 515 in FIG. 5. Because the digital signature size value in block 514 is not included in the computation of digital signature 520, the modification of the digital signature size in block 514 does not invalidate digital signature 520. Additionally, because of the conventional construction of digital signature 520, appending additional memory space 530 at the end of digital signature 520 also does not invalidate digital signature 520. The addition of unused memory space 530 to file 501 enables a third party to store ancillary data in block 530. Ancillary data stored in block 530 can be used for a variety of purposes. For example, ancillary data stored in block 530 can include distribution related information, URLs, pricing information, timestamps, distribution channel information, business rules, digital rights management (DRM) information, distributor branding information, pointers or links to other information, and any other information of use to a software manufacturer, distributor, wholesaler, retailer, or end user. It will be apparent to one of ordinary skill in the art that a variety of different types of information, including aggregations or combinations of different types of ancillary information may be included in block 530. Such ancillary information can be created, stored, and transferred within block 530 of file 501 without invalidating digital signature 520.

In an alternative embodiment, the data in CRC block 510 can be overwritten with ancillary data. Because the CRC value in block 510 is not included in the computation of digital signature 520, the modification of the CRC data in block 510 does not invalidate digital signature 520. However, the size of CRC block 510 is very restrictive. In typical implementations of the structure of file 501, a very small amount of information can be stored in block 510. A pointer, link, or index to a larger block of ancillary data could be stored in block 510, such ancillary data being stored in a local or remote location (e.g. a server)

Figure 6:
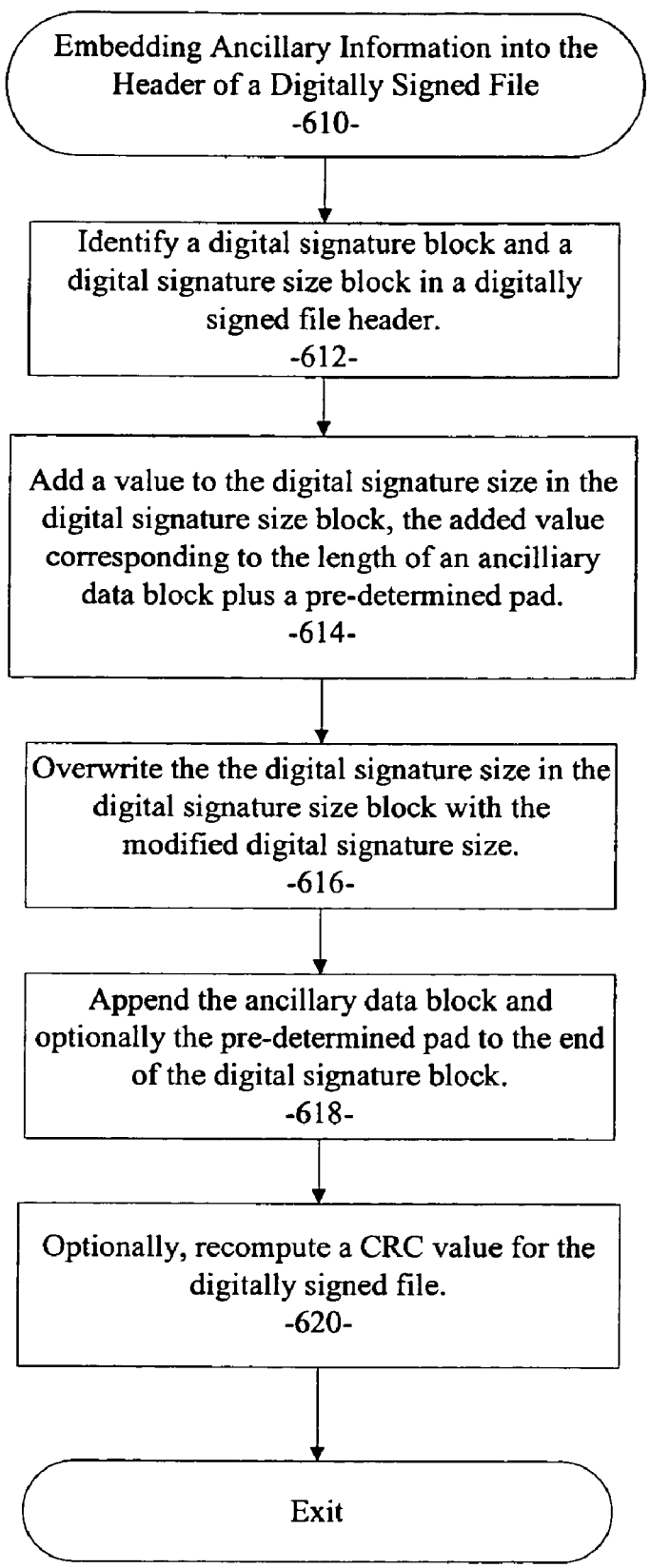
FIG. 6 illustrates a flow chart showing the basic processing operations performed in an embodiment.

Referring to FIG. 6, a flow chart illustrates the basic processing operations performed in an embodiment. At block of 612, a digitally signed file 501 is read and a digital signature block and a digital signature size block the end, the digitally signed file header is identified. In block 614, the digital signature size is retrieved from the digital signature size block and the digital signature size value is modified. The value of the digital signature size is modified by taking the size of the digital signature (i.e. the old value in the digital signature size block) and adding to it the size of an unused data block in which ancillary data can be stored. In some cases, it may be necessary to increase (or decrease) the modified digital signature size value by a pre-determined pad value to terminate the ancillary data block on a byte, word, page, or other memory segment boundary. In other cases, it may be necessary to preliminarily zero out or store a default value in each memory location of ancillary data block 530. This new digital signature size value is stored in the digital signature size block in processing block 616. The ancillary data corresponding to this digitally signed file 501 is generated in processing block 618 and stored in ancillary data block 530. In processing block 620, the CRC value for the modified file 501 can be recomputed and stored in CRC block 510. Given the ancillary data stored in block 530 within digitally signed file 510 according to various embodiments, a specific installer can be created for a particular software product by a third party. Further, digitally signed files can be modified to include digital rights management policies, access controls, purchasing procedures, or a variety of other content-specific, party-specific, or transaction-specific information associated with a particular digitally signed file 501.

Figure 7A:
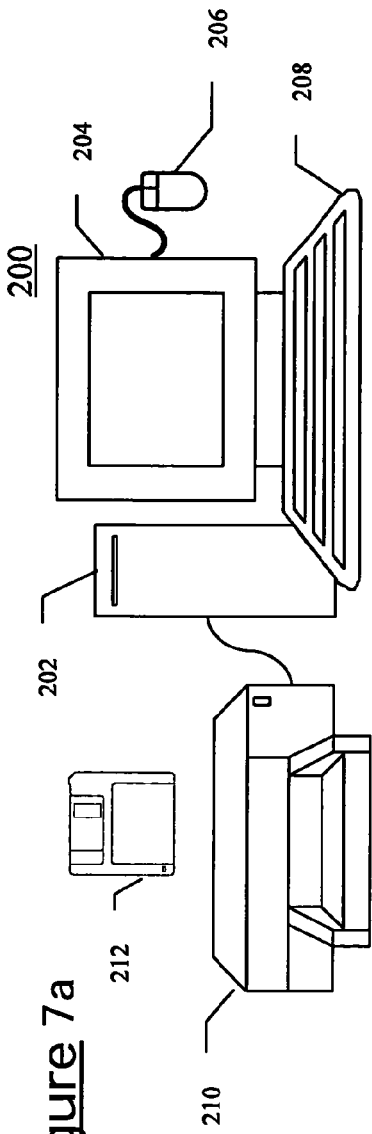
FIGS. 7a and 7b are block diagrams of a computing system on which an embodiment may operate and in which embodiments may reside.
Figure 7B:
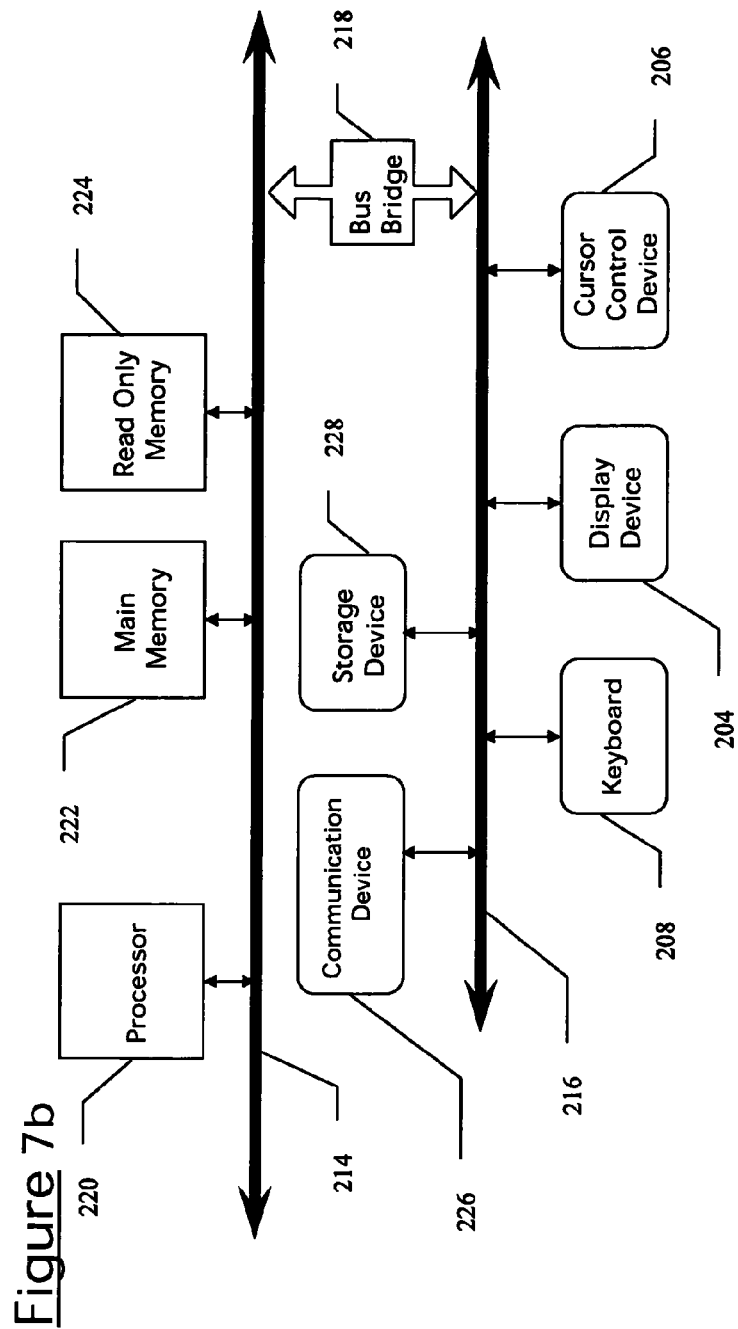

FIGS. 7a and 7b show an example of a computer system 200 illustrating an exemplary client or server computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

A communication device 226 may also be coupled to bus 216 for accessing remote computers or servers, such as a web server, or other servers via the Internet, for example. The communication device 226 may include a modem, a network interface card, or other well-known interface devices, such as those used for interfacing with Ethernet, Token-ring, wireless, or other types of networks. In any event, in this manner, the computer system 200 may be coupled to a number of servers via a conventional network infrastructure.

The system of an example embodiment includes software, information processing hardware, and various processing steps, as described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

It should be noted that the methods described herein do not have to be executed in the order described, or in any particular order. Moreover, various activities described with respect to the methods identified herein can be executed in repetitive, simultaneous, recursive, serial, or parallel fashion. Information, including parameters, commands, operands, and other data, can be sent and received in the form of one or more carrier waves through communication device 226.

Upon reading and comprehending the content of this disclosure, one of ordinary skill in the art will understand the manner in which a software program can be launched from a computer-readable medium in a computer-based system to execute the functions defined in the software program described above. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment, including HTML and XML.

Thus, other embodiments may be realized. For example, FIGS. 7a and 7b illustrate block diagrams of an article of manufacture according to various embodiments, such as a computer 200, a memory system 222, 224, and 228, a magnetic or optical disk 212, some other storage device 228, and/or any type of electronic device or system. The article 200 may include a computer 202 (having one or more processors) coupled to a computer-readable medium 212, and/or a storage device 228 (e.g., fixed and/or removable storage media, including tangible memory having electrical, optical, or electromagnetic conductors) or a carrier wave through communication device 226, having associated information (e.g., computer program instructions and/or data), which when executed by the computer 202, causes the computer 202 to perform the methods described herein.

Various embodiments are described. In particular, the use of embodiments with various types and formats of user interface presentations may be described. It will be apparent to those of ordinary skill in the art that alternative embodiments of the implementations described herein can be employed and still fall within the scope of the claims set forth below. In the detail herein, various embodiments are described as implemented in computer-implemented processing logic denoted sometimes herein as the "Software". As described above, however, the claimed invention is not limited to a purely software implementation.

Thus, a computer-implemented method and system for embedding ancillary information into the header of a digitally signed executable are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

We claim:

1. A method comprising:
   identifying, by use of a processor, an existing digital signature block and an existing digital signature size block in a digitally signed file header;
   modifying a digital signature size value in the digital signature size block, the modified value corresponding to the size of the digital signature block plus the length of an ancillary data block plus a pre-determined pad;
   appending the ancillary data block to the end of the digital signature block, the modifying and appending being performed without invalidating an existing digital signature of the digitally signed file header; and
   storing ancillary data in the ancillary data block.

2. The method as claimed in claim 1 further including recomputing a CRC value for the digitally signed file.

3. The method as claimed in claim 1 further including storing data in the pre-determined pad.

4. The method as claimed in claim 1 wherein the ancillary data includes a URL.

5. The method as claimed in claim 1 wherein the ancillary data includes a pricing information.

6. The method as claimed in claim 1 wherein the ancillary data includes digital rights management information.

7. The method as claimed in claim 1 wherein the ancillary data includes distribution network information.

8. The method as claimed in claim 1 wherein the ancillary data includes a timestamp.

9. The method as claimed in claim 1 wherein the ancillary data includes information identifying a product.

10. The method as claimed in claim 1 wherein the ancillary data includes information uniquely identifying the corresponding digitally signed file.

11. An article of manufacture embodied as a non-transitory machine-accessible medium including data that, when accessed by a machine, causes the machine to perform operations comprising:
    identifying an existing digital signature block and an existing digital signature size block in a digitally signed file header;
    modifying a digital signature size value in the digital signature size block, the modified value corresponding to the size of the digital signature block plus the length of an ancillary data block plus a pre-determined pad;
    appending the ancillary data block to the end of the digital signature block, the modifying and appending being performed without invalidating an existing digital signature of the digitally signed file header; and
    storing ancillary data in the ancillary data block.

12. The article of manufacture as claimed in claim 11 further including recomputing a CRC value for the digitally signed file.

13. The article of manufacture as claimed in claim 11 further including storing data in the pre-determined pad.

14. The article of manufacture as claimed in claim 11 wherein the ancillary data includes a URL.

15. The article of manufacture as claimed in claim 11 wherein the ancillary data includes a pricing information.

16. The article of manufacture as claimed in claim 11 wherein the ancillary data includes digital rights management information.

17. The article of manufacture as claimed in claim 11 wherein the ancillary data includes distribution network information.

18. The article of manufacture as claimed in claim 11 wherein the ancillary data includes a timestamp.

19. The article of manufacture as claimed in claim 11 wherein the ancillary data includes information identifying a product.

20. The article of manufacture as claimed in claim 11 wherein the ancillary data includes information uniquely identifying the corresponding digitally signed file.

21. A method comprising:
   identifying, by use of a processor, an existing CRC block in a digitally signed file header;
   storing ancillary data associated with an index; and
   modifying the CRC block in the digitally signed file header with the index value to retrieve ancillary data, the modifying being performed without invalidating an existing digital signature of the digitally signed file header.

22. The method as claimed in claim 21 wherein the ancillary data is stored on a server.

23. The method as claimed in claim 21 wherein the ancillary data is stored in local memory.

24. The method as claimed in claim 21 wherein the ancillary data is stored in a data storage device.

25. The method as claimed in claim 1 further including appending a pre-determined pad block to the end of the ancillary data block.

26. The article of manufacture as claimed in claim 11 further including appending a pre-determined pad block to the end of the ancillary data block.

* * * * *